United States Patent
Tomita

(10) Patent No.: US 11,199,259 B2
(45) Date of Patent: Dec. 14, 2021

(54) CONTROL DEVICE FOR SHIFT-BY-WIRE SYSTEM

(71) Applicant: TOYOTA JIDOSHA KABUSHIKI KAISHA, Toyota (JP)

(72) Inventor: Takashi Tomita, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/134,947

(22) Filed: Dec. 28, 2020

(65) Prior Publication Data

US 2021/0270363 A1    Sep. 2, 2021

(30) Foreign Application Priority Data

Feb. 28, 2020  (JP) .............................. JP2020-033264

(51) Int. Cl.
*F16H 61/16* (2006.01)
*F16H 59/74* (2006.01)
(Continued)

(52) U.S. Cl.
CPC ........... *F16H 61/16* (2013.01); *F16H 59/105* (2013.01); *F16H 59/74* (2013.01); *F16H 61/0248* (2013.01); *F16H 61/12* (2013.01); *F16H 61/18* (2013.01); *F16H 63/48* (2013.01); *B60K 6/08* (2013.01); *F16H 2059/746* (2013.01); *F16H 2061/005* (2013.01); *F16H 2061/1292* (2013.01); *F16H 2061/168* (2013.01)

(58) Field of Classification Search
CPC .. F16H 59/105; F16H 59/74; F16H 2059/746; F16H 61/0248; F16H 61/12; F16H 61/16; F16H 61/18; F16H 2061/005; F16H 2061/1292; F16H 2061/168; F16H 2061/0234; F16H 2061/1232; F16H 63/48; B60W 10/06; B60W 10/11; B60W 10/26; B60W 2510/242; B60W 2510/244
See application file for complete search history.

(56) References Cited

U.S. PATENT DOCUMENTS

2014/0103872 A1*  4/2014  Ichikawa ................ H02J 7/025
                                                              320/108
2016/0272210 A1*  9/2016  Matsushita ..... B60W 30/18018
(Continued)

FOREIGN PATENT DOCUMENTS

JP    2018-017295 A    2/2018
JP    2018-025234 A    2/2018

*Primary Examiner* — Edwin A Young
(74) *Attorney, Agent, or Firm* — Oliff PLC

(57) ABSTRACT

A control device supplies electric power to a shift-by-wire system to a sub power supply until starting of an engine by automatic start control is completed after the engine has been stopped by automatic stop control. The control device performs a stopped range switching process in response to outputting of a signal for requiring switching of a shift range from a selection device when electric power is supplied from the sub power supply to the shift-by-wire system. In the stopped range switching process, the shift range is switched to a selected shift range when a voltage of the sub power supply is equal to or greater than a threshold value. On the other hand, the shift range is switched to a neutral range when the voltage of the sub power supply is less than the threshold value.

5 Claims, 7 Drawing Sheets

(51) Int. Cl.
*F16H 59/10* (2006.01)
*F16H 61/12* (2010.01)
*F16H 61/18* (2006.01)
*F16H 61/02* (2006.01)
*F16H 63/48* (2006.01)
*B60K 6/08* (2006.01)
*F16H 61/00* (2006.01)

(56) References Cited

U.S. PATENT DOCUMENTS

2018/0045309 A1 2/2018 Kamada et al.
2018/0056971 A1* 3/2018 Inoue .................... B60W 10/26
2018/0149268 A1* 5/2018 Nakade ................... B60T 1/005

* cited by examiner

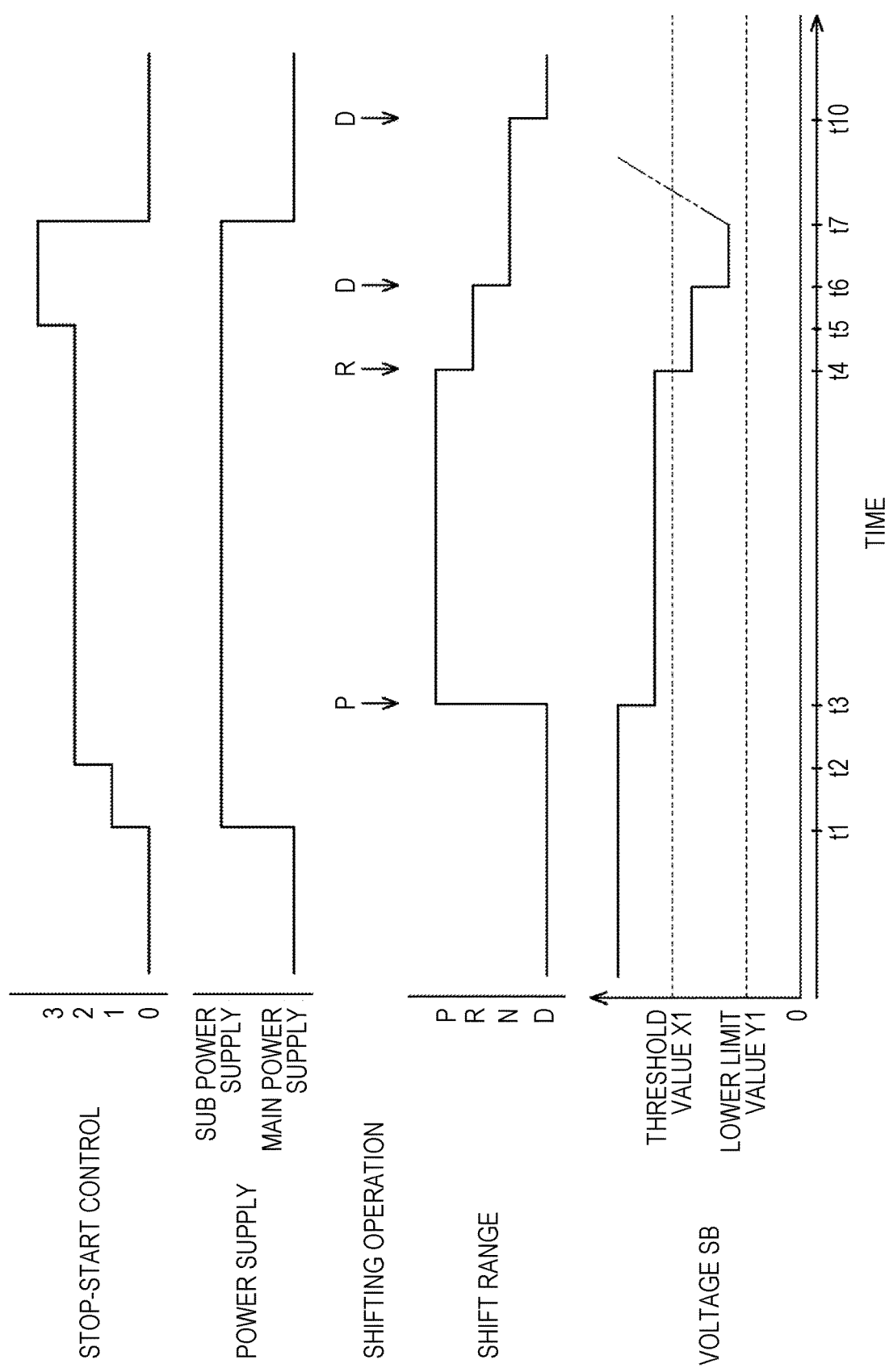

CONTROL DEVICE FOR SHIFT-BY-WIRE SYSTEM

INCORPORATION BY REFERENCE

The disclosure of Japanese Patent Application No. 2020-033264 filed on Feb. 28, 2020 including the specification, drawings and abstract is incorporated herein by reference in its entirety.

BACKGROUND

1. Technical Field

The present disclosure relates to a control device for a shift-by-wire system.

2. Description of Related Art

Japanese Unexamined Patent Application Publication No. 2018-25234 (JP 2018-25234 A) discloses a shift-by-wire system that operates a manual valve by activating an actuator of an automatic transmission with electric power supplied from a power supply and switches a shift range when a selection device that is operated by a driver and that outputs a signal for requiring switching of the shift range is operated. In the configuration described in JP 2018-25234 A, when starting of an engine with a starter motor and activation of the actuator of the automatic transmission are simultaneously performed, a voltage of a power supply decreases and the actuator cannot be appropriately activated.

As a countermeasure against such problems, Japanese Unexamined Patent Application Publication No. 2018-17295 (JP 2018-17295 A) discloses that a start time of one of switching of a shift range and starting of an engine is delayed when operation of a selection device and starting of the engine are simultaneously performed. By delaying the start time of one operation such that the starter motor and the actuator are not simultaneously activated in this way, it is possible to avoid a considerable decrease in voltage.

SUMMARY

However, when the start time of one of starting of the engine and switching of the shift range is delayed as described above, starting of the engine or switching of the shift range is performed later than a driver's operation.

When starting of the engine and switching of the shift range are simultaneously performed, the voltage decreases, and activation of the actuator is stopped partway before switching of the shift range ends, there is concern of a vehicle being driven in a state in which a shift range different from the shift range selected by the driver is set.

Aspects and operational advantages of the present disclosure will be described below. A control device for a shift-by-wire system according to an aspect of the present disclosure is applied to a vehicle including a shift-by-wire system that operates a manual valve of an automatic transmission by driving an electric actuator based on a signal which is output from a selection device that is operated by a driver, including a main power supply and a sub power supply as power supplies for supplying electric power to auxiliary machines of an engine, and performing automatic stop control for automatically stopping the engine when a predetermined stop condition is satisfied and automatic start control for automatically starting the engine when a predetermined start condition is satisfied. The control device is configured to perform a power supply switching process of switching the power supply for supplying electric power to the shift-by-wire system to the sub power supply until starting of the engine by the automatic start control is completed after the engine has been stopped by the automatic stop control and to perform a stopped range switching process of switching a shift range to a selected shift range based on the premise that a voltage of the sub power supply is equal to or greater than a threshold value in response to outputting of a signal for requiring switching of the shift range from the selection device when electric power is supplied from the sub power supply to the shift-by-wire system and switching the shift range to a non-driven range in which drive power is not transmitted to driving wheels when the voltage of the sub power supply is less than the threshold value.

With this configuration, switching of the shift range is performed using electric power of the sub power supply until starting of the engine by automatic start control is completed. That is, the actuator is activated using electric power of the sub power supply rather than the main power supply of which a voltage decreases with starting of the engine. Accordingly, even when a start time of the engine based on satisfaction of a start condition and an activation time of the actuator based on an operation of requiring switching of the shift range overlap each other, activation of the actuator is not affected by a decrease in voltage of the main power supply based on starting of the engine.

Since the sub power supply is an auxiliary power supply which is used when the main power supply cannot be used, an amount of electric power accumulated therein is less than an amount of electric power accumulated in the main power supply. Accordingly, when the electric power of the sub power supply decreases and the voltage thereof decreases due to repetition of switching of the shift range or the like, the actuator may be stopped partway. Therefore, in this configuration, when the voltage of the sub power supply is less than the threshold value and a driven range in which drive power is transmitted to the driving wheels is selected, the shift range is switched to the non-driven range. Accordingly, when electric power accumulated in the sub power supply decreases, the shift range is fixed to a non-driven range and thus it is possible to avoid driving of the vehicle in a state in which the actuator is stopped partway and a shift range other than the shift range selected by a driver is set.

That is, with this configuration, it is possible to realize switching of the shift range corresponding to a driver's operation using electric power of the sub power supply as much as possible. When an amount of electric power of the sub power supply is small, the shift range is switched to a non-driven range and thus it is possible to prevent drive power from being transmitted to the driving wheels in a state in which the actuator is stopped partway and a driven range other than the selected shift range is set.

In the control device for a shift-by-wire system according to an aspect of the present disclosure, the control device may be configured to further perform a vehicle fixing process of switching the shift range to a parking range in which a parking lock mechanism is activated and prohibiting switching of the shift range in response to the signal from the selection device when a voltage of the main power supply is less than the threshold value and less than a lower-limit threshold value which is greater than a lower limit value of a voltage required for switching the shift range to the parking range.

With this configuration, when the voltage of the power supply decreases remarkably, the shift range is switched to the parking range and the parking lock mechanism is activated, whereby movement of the vehicle is regulated. Thereafter, switching of the shift range in response to the signal from the selection device is prohibited. Accordingly, before the voltage of the power supply decreases and switching of the shift range cannot be appropriately performed, the parking lock mechanism can be activated to regulate movement of the vehicle.

In the control device for a shift-by-wire system according to an aspect of the present disclosure, the threshold value may be a voltage at which switching of the shift range to a neutral range and switching to the parking range subsequent thereto are possible, and the stopped range switching process may include switching the shift range to the neutral range and prohibiting switching of the shift range to a range other than the parking range in response to the signal from the selection device when the voltage of the sub power supply at the time of outputting of the signal for requiring switching of the shift range from the selection device is less than the threshold value.

With this configuration, in the stopped range switching process, when the voltage of the sub power supply is less than the threshold value and switching of the shift range is requested, electric power which is required to switch the shift range to the parking range in the vehicle fixing process is left and the shift range is switched to the neutral range. Accordingly, it is possible to perform the stopped range switching process in a state in which room for performing the vehicle fixing process is left.

Switching to the parking range is permitted. Accordingly, when a driver selects the parking range, it is possible to activate the parking lock mechanism as requested and to regulate movement of the vehicle.

In the control device for a shift-by-wire system according to an aspect of the present disclosure, the stopped range switching process may include releasing prohibition of switching of the shift range in response to the signal from the selection device when the voltage of the sub power supply is recovered to a value equal to or greater than the threshold value.

With this configuration, when the voltage of the sub power supply is recovered to a value equal to or greater than the threshold value, switching of the shift range in response to the signal from the selection device becomes possible. In the control device for a shift-by-wire system according to an aspect of the present disclosure, the power supply switching process may include switching the power supply for supplying electric power to the shift-by-wire system to the main power supply when starting of the engine has been completed.

With this configuration, when starting of the engine is completed, activation of a starter motor ends, and charging of the main power supply and the sub power supply becomes possible, it is possible to perform rapid return to a state in which supply of electric power to the shift-by-wire system is performed using the main power supply.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10 is a timing diagram illustrating a stop-start controlled state, types of power supplies, a shift operation, shift ranges, and change of a voltage of a sub power supply.

DETAILED DESCRIPTION OF EMBODIMENTS

Figure 1:
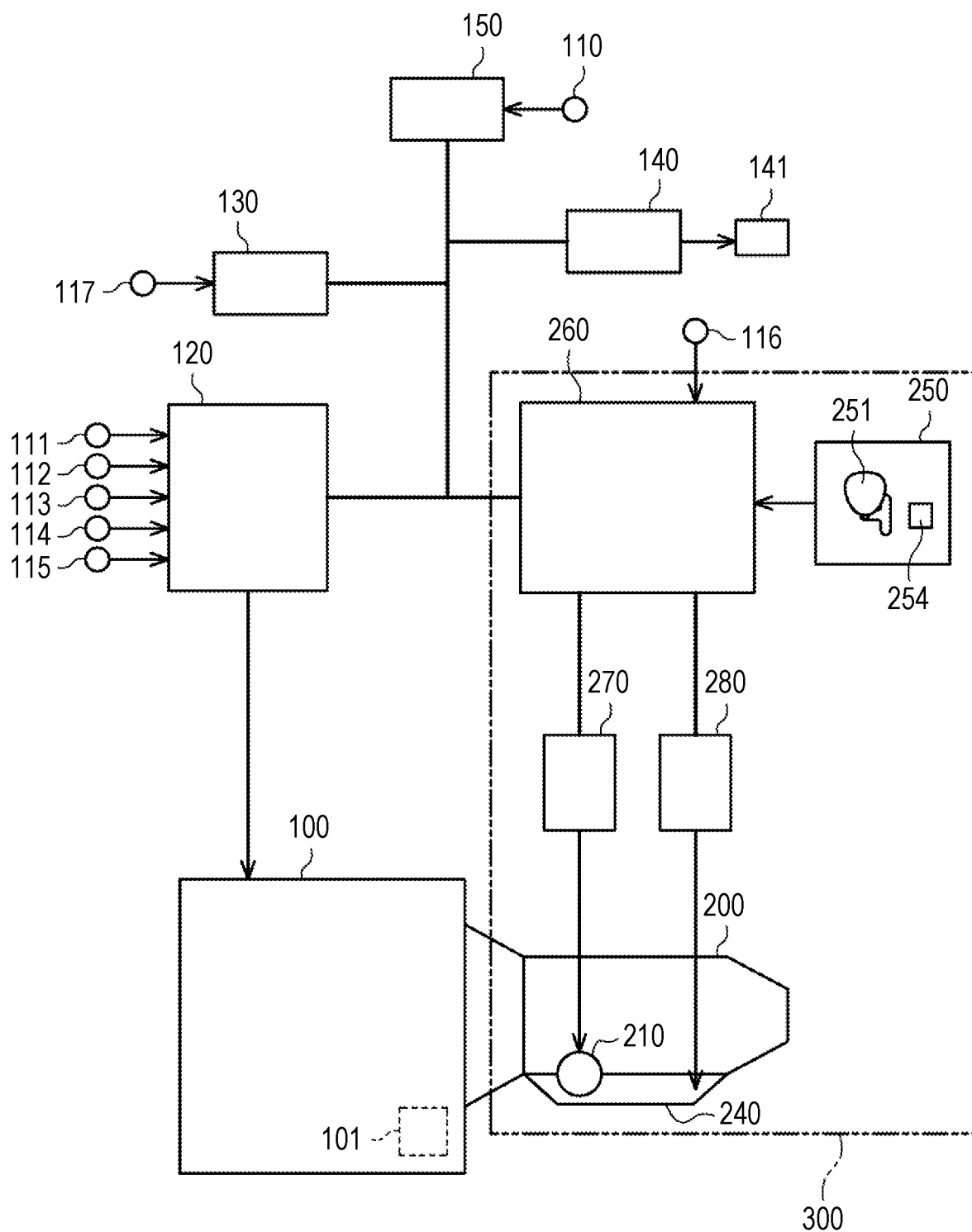
FIG. 1 is a diagram schematically illustrating a relationship between a shift ECU which is a control device according to an embodiment and a power train of a vehicle in which a shift-by-wire system is mounted.

A shift ECU which is a control device for a shift-by-wire system will be described below with reference to FIGS. 1 to 10. As illustrated in FIG. 1, a vehicle in which a shift ECU 260 is mounted includes an engine 100 as a drive power source. The engine 100 is connected to an automatic transmission 200. In the vehicle, drive power of the engine 100 is transmitted to driving wheels via the automatic transmission 200.

A selection device 250 that is operated by a driver to output a signal for requiring switching of a shift range is connected to the shift ECU 260. In the vehicle, when the selection device 250 is operated, the shift ECU 260 receives a signal output from the selection device 250 and issues a command to an actuator ECU 270. The actuator ECU 270 electrically activates an actuator 210 of the automatic transmission 200 to switch the shift range. In this way, a shift-by-wire system 300 that converts an operation input to the selection device 250 into an electrical signal, transmits the converted signal, and activates the electric actuator 210 to switch the shift range of the automatic transmission 200 is mounted in the vehicle. A gear shifting ECU 280 that controls a hydraulic circuit 240 of the automatic transmission 200 in accordance with a command from the shift ECU 260 to switch a gear stage is also provided in the shift-by-wire system 300.

In addition to the shift ECU 260, an engine ECU 120, a stop-start ECU 130, a meter ECU 140, a comparison ECU 150, and the like are provided in the vehicle. Such ECUs are electronic control units each including a memory that stores a program and a processor that executes the program. In the vehicle, the ECUs are communicatively connected to each other.

Detection signals from various sensors such as an air flowmeter 111, an accelerator position sensor 112, a crank position sensor 113, a coolant temperature sensor 114, and an oil temperature sensor 115 are input to the engine ECU 120. The engine ECU 120 performs throttle control, fuel injection control, and ignition time control based on signals from such various sensors. At the time of starting the engine 100, the engine ECU 120 drives a starter motor 101 to perform cranking and starts the engine 100.

The stop-start ECU 130 outputs a command for automatically stopping operation of the engine 100 to the engine ECU 120 when predetermined stop conditions are satisfied. The stop-start ECU 130 outputs a command for automatically starting the engine 100 to the engine ECU 120 when predetermined start conditions are satisfied. The engine ECU 120 automatically stops or automatically starts operation of the engine 100 in accordance with a command input thereto. That is, the stop-start ECU 130 performs automatic stop control for automatically stopping the engine 100 when the predetermined stop conditions are satisfied and automatic start control for automatically starting the engine 100 when the predetermined start conditions are satisfied. In the following description, for the purpose of convenience, automatic stop control and automatic start control are referred to collectively as stop-start control. A signal from a stop lamp switch 117 that detects that a brake pedal is depressed is input to the stop-start ECU 130.

The predetermined stop conditions are conditions for automatically stopping the engine 100. In the stop-start ECU 130, a state in which all of the following four conditions have been satisfied is defined as a state in which the predetermined stop conditions have been satisfied.

Warm-up of the engine 100 is completed

A brake pedal is depressed.

An accelerator pedal is not depressed.

A vehicle speed SPD is equal to or less than a predetermined vehicle speed.

Whether warm-up has been completed is determined based on whether a temperature of a coolant of the engine 100 detected by the coolant temperature sensor 114 is equal to or greater than a predetermined temperature which is a threshold value for determining completion of warm-up. Depression of the brake pedal can be detected by the stop lamp switch 117. Depression of the accelerator pedal can be detected based on an output signal of the accelerator position sensor 112.

The predetermined start conditions are conditions for automatically starting the engine 100. In the stop-start ECU 130, a state in which the predetermined stop conditions have not been satisfied is defined as a state in which the predetermined start conditions have been satisfied. For example, when depression of the brake pedal is released in a state in which the predetermined stop conditions have been satisfied or when the accelerator pedal is depressed, the predetermined start conditions are satisfied.

The meter ECU 140 displays information indicating a vehicle state, information for warning of occurrence of a failure, or the like on a display unit 141 such as a monitor panel which is provided in a driver's seat of the vehicle. The comparison ECU 150 performs comparison of an ID of an electronic key when a main switch 110 is operated, and starts a system of the vehicle only when the comparison is successful.

A detection signal from a vehicle speed sensor 116 is input to the shift ECU 260. The engine ECU 120 calculates an engine rotation speed NE which is a rotation speed of an output shaft of the engine 100 based on an output signal of the crank position sensor 113. The shift ECU 260 calculates a required gear stage based on an accelerator operation amount ACCP detected by the accelerator position sensor 112, the engine rotation speed NE, and the vehicle speed SPD detected by the vehicle speed sensor 116. Then, the shift ECU 260 outputs a signal for commanding to switch to the calculated required gear stage to the gear shifting ECU 280. The gear shifting ECU 280 controls the hydraulic circuit 240 based on a signal output from the shift ECU 260 such that the gear stage of the automatic transmission 200 matches the required gear stage calculated by the shift ECU 260.

The selection device 250 which is connected to the shift ECU 260 includes a shift lever 251 and a parking switch 254, and is a device that receives an operation of selecting a shift range by allowing a driver to operate the shift lever 251 or the parking switch 254.

Figure 2:
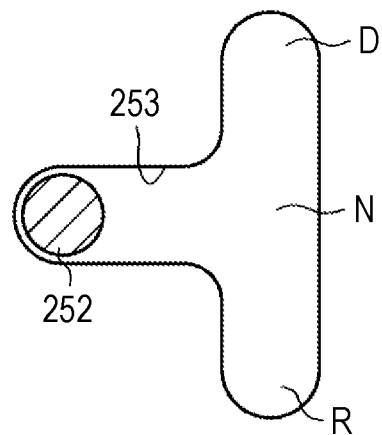
FIG. 2 is a diagram illustrating a pattern of operations of a shift lever in a selection device which is connected to the shift ECU.

As illustrated in FIG. 2, a shift gate 253 that guides a shaft 252 of the shift lever 251 is provided in the selection device 250. In FIG. 2, a state in which the shaft 252 of the shift lever 251 is located at a reference position is illustrated. In the selection device 250, when the shift lever 251 is not operated, the shaft 252 returns to the reference position. A position which is reached by moving the shaft 252 from the reference position to the right side in FIG. 2 along the shift gate 253 is defined as an N position. A position which is reached by moving the shaft 252 upward from the N position in FIG. 2 along the shift gate 253 is defined as a D position. On the other hand, a position which is reached by moving the shaft 252 downward from the N position in FIG. 2 along the shift gate 253 is defined as an R position. The parking switch 254 is a switch for selecting a P position.

The selection device 250 outputs a signal based on the position of the shaft 252 or a signal based on the operation of the parking switch 254 to the shift ECU 260. Specifically, when the shaft 252 is operated to the D position, the selection device 250 outputs a request for switching the shift range to a drive range to the shift ECU 260. The drive range is a shift range in which drive power generated by the engine 100 is transmitted to the driving wheels as drive power in a direction in which the vehicle moves forward. When the shift range is the drive range, the shift ECU 260 controls the automatic transmission 200 such that the drive power in the direction in which the vehicle travels forward is transmitted to the driving wheels.

When the shaft 252 is operated to the R position, the selection device 250 outputs a request for switching the shift range to a reverse range to the shift ECU 260. The reverse range is a shift range in which drive power generated by the engine 100 is transmitted to the driving wheels as drive power in a direction in which the vehicle travels in reverse. When the shift range is the reverse range, the shift ECU 260 controls the automatic transmission 200 such that the drive power in the direction in which the vehicle travels in reverse is transmitted to the driving wheels.

When the shaft 252 is held at the N position for a predetermined time, for example, 2 seconds, the selection device 250 outputs a request for switching the shift range to a neutral range to the shift ECU 260. The neutral range is a shift range which is selected when the vehicle is towed, the vehicle is made to coast, or the like and is a shift range in which transmission of drive power between the engine 100 and the driving wheels is intercepted. When the shift range is the neutral range, the shift ECU 260 controls the automatic transmission 200 such that the drive power generated by the engine 100 is not transmitted to the driving wheels. Specifically, the shift ECU 260 outputs a command to the actuator ECU 270 and the gear shifting ECU 280 such that transmission of drive power via the automatic transmission 200 is intercepted and the drive power generated by the engine 100 is not transmitted to the driving wheels. That is, the neutral range is a shift range in which the drive power of the engine 100 is not transmitted to the driving wheels, that is, a so-called non-driven range.

When the parking switch 254 is operated and the P position is selected, the selection device 250 outputs a request for switching the shift range to a parking range to the shift ECU 260. The parking range is a shift range which is selected to hold a state in which the vehicle has parked and then stopped.

Figure 3:
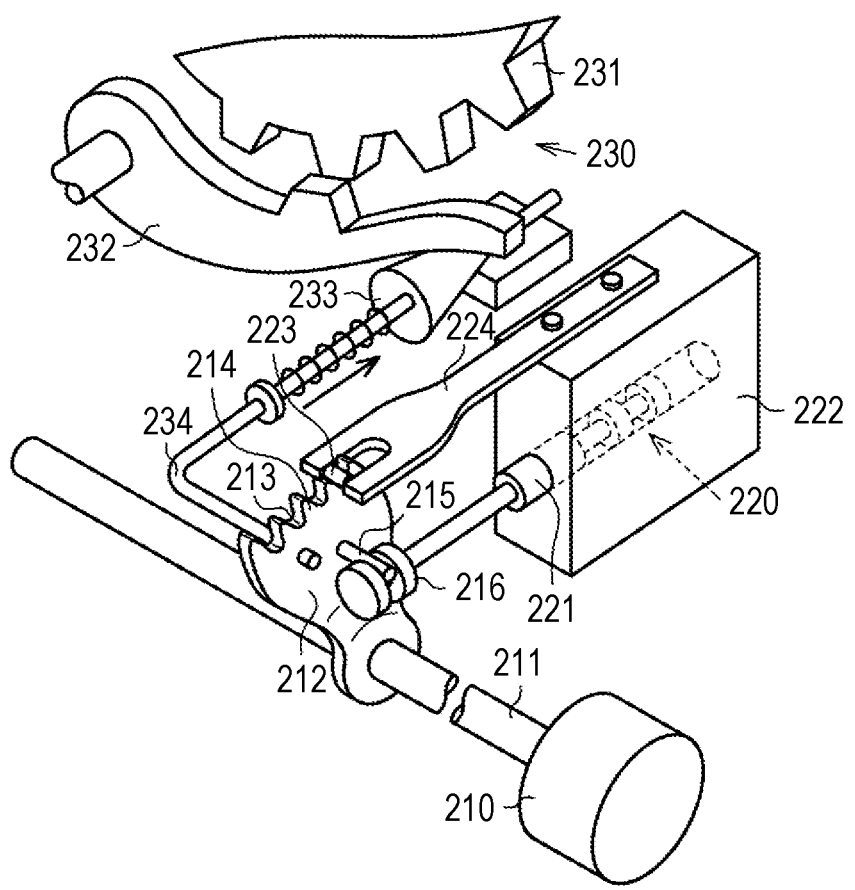
FIG. 3 is a perspective view illustrating a relationship between an actuator of an automatic transmission, a manual valve, and a parking lock mechanism.

As illustrated in FIG. 3, a parking lock mechanism 230 that mechanically fixes the output shaft of the automatic transmission 200 such that the driving wheels do not rotate when the parking range is selected is provided in the automatic transmission 200. The parking lock mechanism 230 which is activated by the actuator 210 will be described below in detail with reference to FIG. 3.

The actuator 210 is activated by the actuator ECU 270 which has received a command from the shift ECU 260 as described above. The actuator 210 is, for example, a switch-retracting motor. The shift ECU 260 ascertains a rotation state of the actuator 210 and controls supply of electric power to the actuator 210 using a command for the actuator ECU 270.

The parking lock mechanism 230 is accommodated in a case of the automatic transmission 200. The parking lock mechanism 230 physically regulates rotation of the driving wheels by causing a parking gear 231 rotating along with the rotation of the driving wheels and a lock pole 232 attached to the case side of the automatic transmission 200 to engage with each other.

The parking lock mechanism 230 includes a rod 234 that operates with the rotation of the actuator 210 in addition to the parking gear 231 and the lock pole 232. As illustrated in FIG. 3, a plate 212 that is penetrated by a shaft 211 which is an output shaft of the actuator 210 and that rotates with rotation of the shaft 211 is fixed to the shaft 211. The rod 234 has an L shape and one end thereof is attached to the plate 212. A tapered member 233 in which the thickness decreases toward a tip thereof is provided at the other end of the rod 234. The lock pole 232 is in contact with the tapered member 233. Accordingly, in the parking lock mechanism 230, when the actuator 210 is activated and the plate 212 rotates, the rod 234 moves with the rotation. The lock pole 232 which is in contact with the tapered member 233 operates with movement of the rod 234.

As illustrated in FIG. 3, a manual valve 220 that operates at the time of switching of the shift range is accommodated in the case of the automatic transmission 200. A valve member 221 of the manual valve 220 is a cylindrical spool valve and is accommodated in a valve body 222. A connection member 216 having a groove formed therein is attached to a part of the valve member 221 which protrudes from the valve body 222. A connection pin 215 that protrudes from the surface of the plate 212 engages the groove of the connection member 216. Accordingly, in the manual valve 220, the valve member 221 moves in an extending direction of a center axis thereof with rotation of the plate 212.

Unevenness including four valleys 213 is provided on the top of the plate 212. A leaf spring 224 is attached into the case of the automatic transmission 200. One end of the leaf spring 224 is fixed to the case and an engagement pin 223 is provided at the other end of the leaf spring 224. The engagement pin 223 engages with the valleys 213 provided on the top of the plate 212. When the plate 212 is rotated by the actuator 210, the engagement pin 223 is pushed up along the unevenness of the top of the plate 212 while deforming the leaf spring 224 and permits rotation of the plate. That is, by causing the engagement pin 223 to engage with one of the four valleys 213, the plate 212 is positioned in a rotational direction.

The manual valve 220 switches a connection mode of an oil passage in the hydraulic circuit 240 of the automatic transmission 200 along the valley 213 engaging with the engagement pin 223. The four valleys 213 provided in the plate 212 correspond to the parking range, the reverse range, the neutral range, and the drive range.

FIG. 3 illustrates a state in which the engagement pin 223 engages with the valley 213 corresponding to the drive range. In this state, that is, a state in which the shift range is set to the drive range, the lock pole 232 does not engage with the parking gear 231. This state is a state in which lock by the parking lock mechanism 230 is released and rotation of the driving wheels is not regulated by the parking lock mechanism 230.

In this state, when the shaft 211 is rotated clockwise from the state illustrated in FIG. 2 by the actuator 210, the rod 234 moves in the direction of an arrow illustrated in FIG. 2 via the plate 212. Then, the lock pole 232 is pushed up to the parking gear 231 by the tapered member 233 provided at the tip of the rod 234.

With rotation of the plate 212, the engagement pin 223 of the leaf spring 224 located in the valley 213 corresponding to the drive range goes over a peak 214 between the valleys 213 and moves to a near valley 213. When the plate 212 rotates until the engagement pin 223 moves to the valley 213 corresponding to the parking range, the lock pole 232 is pushed up to a position at which the lock pole 232 engages with the parking gear 231.

Accordingly, rotation of the driving wheels which rotate along with the parking gear 231 is physically regulated. The valve member 221 of the manual valve 220 also moves with the rotation of the plate 212. Accordingly, at this time, the oil passage of the hydraulic circuit 240 is switched with the movement of the valve member 221 of the manual valve 220 and the shift range is switched to the parking range.

In the shift-by-wire system 300 having the above-mentioned configuration, the shift ECU 260 activates the actuator 210 such that the plate 212 is rotated to a position corresponding to the shift range selected by the selection device 250.

In the automatic transmission 200, three planetary gear devices constitute two gear shifting units. One gear shifting unit of the two gear shifting units is constituted by one planetary gear device, and the other gear shifting unit is constituted by combining two planetary gear devices in a Ravigneaux type planetary gear train. The automatic transmission 200 includes three brakes and two clutches as engagement devices. In the automatic transmission 200, gear stages including six stages for forward travel and one stage for reverse travel are formed by controlling the three brakes and the two clutches through control of the hydraulic circuit 240 by the gear shifting ECU 280.

Figure 4:
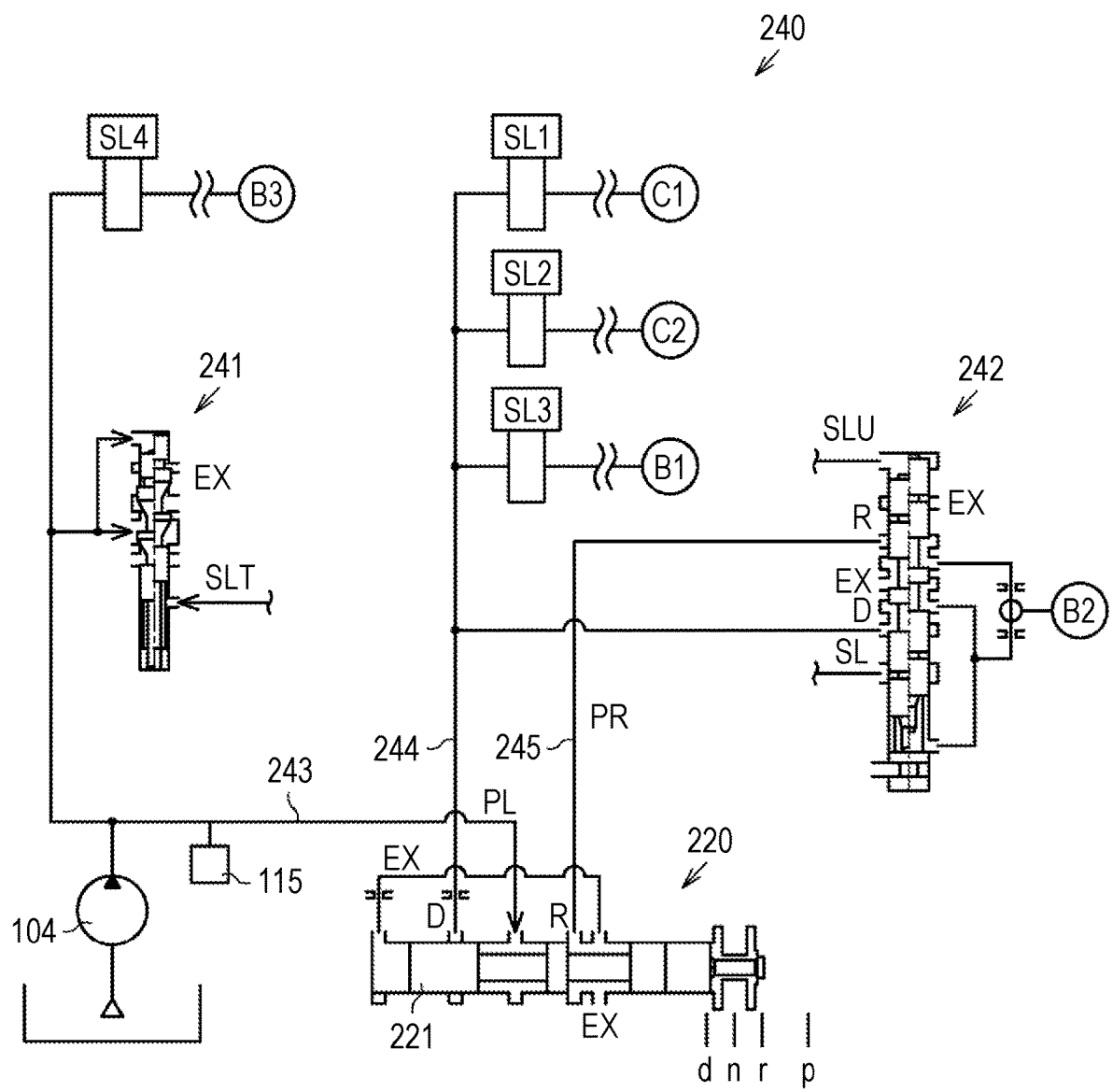
FIG. 4 is a circuit diagram of a hydraulic circuit of the automatic transmission.

A relationship between the hydraulic circuit 240 and the manual valve 220 in the automatic transmission 200 will be described below with reference to FIG. 4. In FIG. 4, the two clutches are illustrated as a first clutch C1 and a second clutch C2. The three brakes are illustrated as a first brake B1, a second brake B2, and a third brake B3. The first clutch C1, the second clutch C2, the first brake B1, the second brake B2, and the third brake B3 are hydraulic frictional engagement devices of which an engaging force is controlled by a hydraulic pressure. Engagement and disengagement of each of the first clutch C1, the second clutch C2, the first brake B1, the second brake B2, and the third brake B3 is independently controlled by the hydraulic circuit 240. The gear stages including six stages for forward travel and one stage for reverse travel are set up by combinations of engagements and disengagements of these five engagement devices.

As illustrated in FIG. 4, the hydraulic circuit 240 includes a primary regulator valve 241, the manual valve 220, four linear solenoid valves, and a control valve 242. In FIG. 4, four linear solenoid valves are illustrated as a first linear solenoid valve SL1, a second linear solenoid valve SL2, a third linear solenoid valve SL3, and a fourth linear solenoid valve SL4. These linear solenoid valves SL1 to SL4 are activated by the gear shifting ECU 280 based on a command from the shift ECU 260.

The hydraulic circuit 240 is supplied with a hydraulic oil from a mechanical oil pump 104 which is driven by the engine 100. A pressure of the hydraulic oil which is pumped by the oil pump 104 and supplied to the hydraulic circuit 240 is adjusted to a predetermined line pressure PL based on the accelerator operation amount ACCP or the like by the primary regulator valve 241 which is supplied with a signal pressure SLT. The signal pressure SLT is output via a linear solenoid valve (not illustrated) which is driven by the gear shifting ECU 280 based on a command from the shift ECU 260.

An engagement hydraulic pressure of the third brake B3 is controlled by the fourth linear solenoid valve SL4 which is supplied with the line pressure PL without any change. That is, engagement and disengagement thereof are controlled by the fourth linear solenoid valve SL4.

As described above, the valve member 221 of the manual valve 220 is driven by the actuator 210. The valve member 221 is positioned at a position corresponding to each shift range by engagement between the valleys 213 provided in the plate 212 and the engagement pin 223. In FIG. 4, the position corresponding to the parking range is indicated by "p," the position corresponding to the reverse range is indicated by "r," the position corresponding to the neutral range is indicated by "n," and the position corresponding to the drive range is indicated by "d," whereby the position of the valve member 221 corresponding to each shift range is illustrated. The manual valve 220 switches a supply destination of the hydraulic oil or stops supply of the hydraulic oil based on the position of the valve member 221.

Specifically, when the valve member 221 is located at the position of "d," the manual valve 220 allows a supply oil passage 243 which is supplied with the line pressure PL and an oil passage for forward travel 244 to communicate with each other. Accordingly, a hydraulic pressure for forward travel PD which is the same as the line pressure PL is output to the oil passage for forward travel 244. The oil temperature sensor 115 is attached to the supply oil passage 243. Accordingly, the temperature of the hydraulic oil in the hydraulic circuit 240 is detected by the oil temperature sensor 115.

As illustrated in FIG. 4, the oil passage for forward travel 244 is connected to the first linear solenoid valve SL1, the second linear solenoid valve SL2, the third linear solenoid valve SL3, and the control valve 242. Engagement and disengagement of the first clutch C1, the second clutch C2, the first brake B1, and the second brake B2 are controlled by adjusting the hydraulic pressure for forward travel PD using the first linear solenoid valve SL1, the second linear solenoid valve SL2, the third linear solenoid valve SL3, and the control valve 242. One gear stage for forward travel of first to sixth gear stages is selectively set up by a control combination of engagement of disengagement of the third brake B3.

The control valve 242 is supplied with a signal pressure SLU and a signal pressure SL. The engagement hydraulic pressure of the second brake B2 is controlled based on the signal pressure SLU. The signal pressure SLU and the signal pressure SL are output via individual linear solenoid valves (not illustrated) which are driven by the gear shifting ECU 280 based on a command from the shift ECU 260.

When the valve member 221 of the manual valve 220 is located at the position of "r," the manual valve 220 causes the supply oil passage 243 via which the line pressure PL is supplied to communicate with an oil passage for reverse travel 245. Accordingly, a hydraulic pressure for reverse travel PR which is the same as the line pressure PL is output to the oil passage for reverse travel 245.

As illustrated in FIG. 4, the oil passage for reverse travel 245 is connected to the control valve 242, and the second brake B2 is engaged by supplying the hydraulic pressure for reverse travel PR to the second brake B2 via the control valve 242. A gear stage for reverse travel is set up by engaging the third brake B3 along with the second brake B2.

When the valve member 221 is located at the position of "p," the manual valve 220 intercepts communication between the supply oil passage 243 which is supplied with the line pressure PL and the oil passage for forward travel 244 and the oil passage for reverse travel 245 and causes the oil passage for forward travel 244 and the oil passage for reverse travel 245 to communicate with an EX port. Accordingly, a hydraulic oil is discharged from the oil passage for forward travel 244 and the oil passage for reverse travel 245. When the hydraulic oil is discharged in this way, all the engagement devices (the first clutch C1, the second clutch C2, the first brake B1, the second brake B2, and the third brake B3) are disengaged. In this state, none of the gear stages for forward travel and the gear stage for reverse travel are set up, and a state in which drive power is not transmitted, that is, a neutral state, is set up. At this time, as described above, the parking lock mechanism 230 operates to perform lock and rotation of the driving wheels is regulated.

As illustrated in FIG. 4, when the valve member 221 is located at the position of "n," the manual valve 220 intercepts communication between the supply oil passage 243 which is supplied with the line pressure PL and the oil passage for forward travel 244 and the oil passage for reverse travel 245 and causes the oil passage for reverse travel 245 to communicate with the EX port to discharge a hydraulic oil. At this time, the shift ECU 260 outputs a command for forming the neutral state to the gear shifting ECU 280, and the gear shifting ECU 280 activates the linear solenoid valves such that all the engagement devices (the first clutch C1, the second clutch C2, the first brake B1, the second brake B2, and the third brake B3) are disengaged. Accordingly, when the valve member 221 is located at the position of "n," that is, when the shift range is set to the neutral range, lock by the parking lock mechanism 230 is released but the neutral state is set up. Accordingly, in this case, drive power of the engine 100 is not transmitted to the driving wheels. That is, the neutral range is a non-driven range in which the drive power of the engine 100 is not transmitted to the driving wheels.

When the shift range is set to the parking range, the shift ECU 260 outputs a command for forming the neutral state to the gear shifting ECU 280 as in the state in which the neutral range is selected. Accordingly, when the shift range is set to the parking range, the automatic transmission 200 is in the neutral state and the parking lock mechanism 230 operates to perform lock. That is, similarly to the neutral range, the parking range is also a non-driven range in which the drive power of the engine 100 is not transmitted to the driving wheels.

On the other hand, the drive range in which the valve member 221 is located at the position of "d" or the reverse range in which the valve member 221 is located the position of "r" is a shift range in which a gear stage for forward travel or a gear stage for reverse travel is formed and is a shift range in which the drive power of the engine 100 is transmitted to the driving wheels, that is, a driven range.

Figure 5:
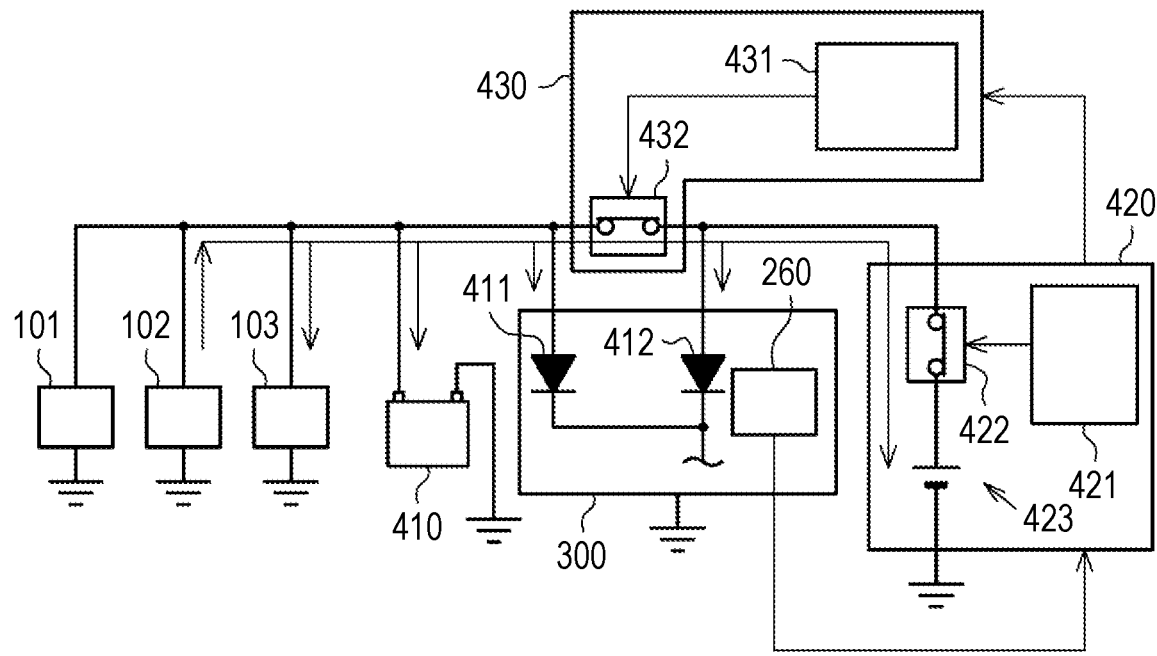
FIG. 5 is a circuit diagram illustrating a path of supplying electric power to the shift-by-wire system.

Supply of electric power to the shift-by-wire system 300 will be described below. As illustrated in FIG. 5, in the vehicle, a main power supply 410 and a sub power supply 423 are provided as power supplies that supply electric power to the shift-by-wire system 300. The main power supply 410 is connected to various auxiliary machines of the engine 100 or the ECUs in addition to the shift-by-wire system 300 and supplies electric power thereto. In FIG. 5, supply destinations of electric power other than the starter motor 101 are illustrated as an electric load 103. The main power supply 410 is a storage battery such as a lead storage battery, a nickel-hydride battery, or a lithium-ion battery.

The sub power supply 423 is incorporated into a sub power supply assembly 420 including a protection relay 422 and a sub power supply ECU 421 that controls the protection relay 422. The sub power supply 423 is a rechargeable power supply with a capacity less than that of the main power supply 410 and is, for example, a capacitor. The sub power supply 423 is connected to the shift-by-wire system 300 via a sub power supply relay 432.

As illustrated in FIG. 5, an input terminal of electric power in the shift-by-wire system 300 is divided into a main side and a sub side, and the shift-by-wire system 300 is supplied with electric power from a terminal other than the main power supply 410 and the sub power supply 423. Specifically, the main power supply 410 is connected to a terminal which is provided in a main-side diode 411 in the shift-by-wire system 300. On the other hand, the sub power supply assembly 420 is connected to a terminal which is provided in a sub-side diode 412 in the shift-by-wire system 300.

As illustrated in FIG. 5, a circuit to which the main power supply 410 is connected and a circuit to which the sub power supply 423 is connected are connected to each other via the sub power supply relay 432. The sub power supply relay 432 constitutes a sub power supply relay assembly 430 along with a sub power supply relay ECU 431 that controls a sub power supply relay 432. An alternator 102 that generates electric power using the power of the engine 100 is connected to the circuit to which the main power supply 410 is connected.

Supply of electric power from the main power supply 410 is controlled by a system main relay which is not illustrated. When the system main relay is turned on by operating a main switch 110, supply of electric power from the main power supply 410 is performed. When the main switch 110 is turned on, first, supply of electric power to the shift ECU 260, the sub power supply ECU 421, the sub power supply relay ECU 431, and other ECUs is performed by the main power supply 410. The shift ECU 260, the sub power supply relay ECU 431, and the sub power supply ECU 421 monitor a voltage of the main power supply 410 and a voltage of the sub power supply 423 together.

In FIG. 5, a flow of a current which is generated by the alternator 102 when the vehicle is traveling is indicated by an arrow. When an amount of electric power generated in the alternator 102 is greater than a total of electric load of the shift-by-wire system 300 in addition to the electric load 103, as indicated by an arrow in FIG. 5, the main power supply 410 and the sub power supply 423 are charged with excess electric power. Before the amount of electric power charged in the sub power supply 423 becomes excessive, the sub power supply ECU 421 opens the protection relay 422 to curb overcharging of the sub power supply 423 and to protect the sub power supply 423. On the other hand, when the amount of electric power generated by the alternator 102 is less than the total of electric load of the shift-by-wire system 300 in addition to the electric load 103, electric power is supplied to the electric load 103 and the shift-by-wire system 300 from the main power supply 410 and the sub power supply 423.

Figure 6:
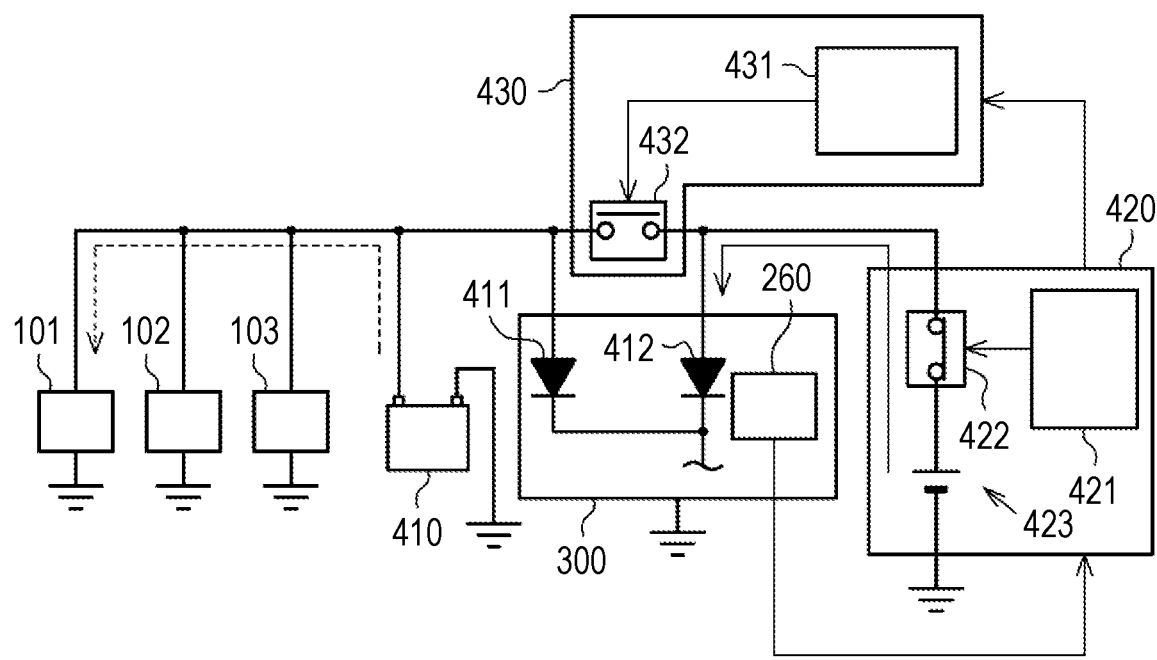
FIG. 6 is a circuit diagram illustrating a state in which electric power is supplied from a sub power supply to the shift-by-wire system.

Since an amount of electric power consumed in cranking of driving the starter motor 101 to start the engine 100 is great, the voltage of the main power supply 410 decreases during cranking. Therefore, as illustrated in FIG. 6, during cranking in the vehicle, the protection relay 422 is closed and the sub power supply relay 432 is opened such that the sub power supply 423 is detached from the circuit to which the main power supply 410 is connected. Accordingly, supply of electric power to the shift-by-wire system 300 is performed by the sub power supply 423 in a state in which it is detached from the other electric load 103, and thus it is possible to secure stable supply of electric power to the shift-by-wire system 300.

In the vehicle, in addition to cranking, when it is determined that there is concern that the voltage of the main power supply 410 decreases and the shift-by-wire system 300 cannot be normally activated, the sub power supply 423 is detached from the circuit to which the main power supply 410 is connected similarly to the state illustrated in FIG. 6. More specifically, as a fail-safe process for a power supply failure, a vehicle fixing process of supplying electric power to the shift-by-wire system 300 from the sub power supply 423 and automatically switching the shift range to the parking range when the vehicle stops to fix the vehicle to a state in which the vehicle stops stably is performed.

Figure 7:
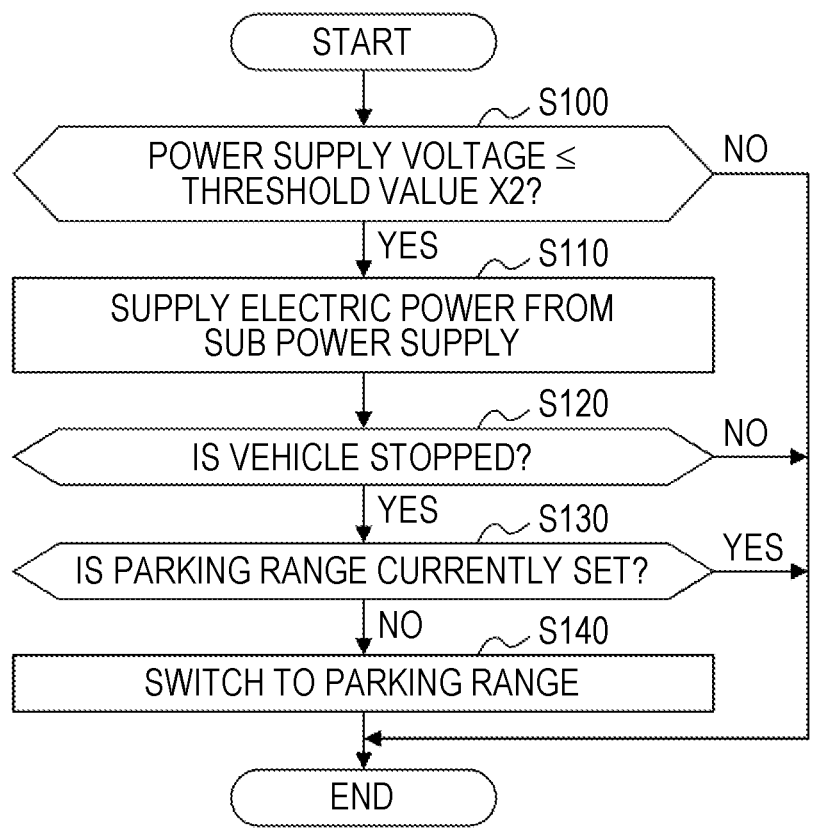
FIG. 7 is a flowchart illustrating a flow of a series of processes in a routine for a vehicle fixing process.

A process routine which is performed by the shift ECU 260 of the shift-by-wire system 300 such as the vehicle fixing process or a power supply switching process of switching a power supply will be described below. FIG. 7 is a flowchart illustrating a flow of a series of processes in a routine associated with the vehicle fixing process. This series of processes is repeatedly performed by the shift ECU 260 when the main switch 110 is turned on and electric power from the main power supply 410 is being supplied.

When the routine is started, the shift ECU 260 first determines whether the voltage of the main power supply 410 is equal to or less than a threshold value X2 in Step S100. As described above, the shift ECU 260, the sub power supply relay ECU 431, and the sub power supply ECU 421 monitor the voltage of the main power supply 410 and the voltage of the sub power supply 423. The shift ECU 260 determines whether the voltage of the main power supply 410 is equal to or less than the threshold value X2 based on information of the voltage which is monitored by the ECUs. The threshold value X2 is set to a value which is greater than a lower limit value of the voltage required for appropriately activating the shift-by-wire system 300 and is a threshold value that is used to determine whether there is concern that the shift-by-wire system 300 cannot be normally activated because the voltage is equal to or less than the threshold value X2.

When it is determined in Step S100 that the voltage of the main power supply 410 is greater than a threshold value X2 (Step S100: NO), the shift ECU 260 temporarily ends the routine without performing any other process.

On the other hand, when it is determined in Step S100 that the voltage of the main power supply 410 is equal to or less than a threshold value X2 (Step S100: YES), the shift ECU 260 causes the routine to proceed to Step S110. In Step S110, the shift ECU 260 switches the power supply that supplies electric power to the shift-by-wire system 300 to the sub power supply 423.

Specifically, in Step S110, the shift ECU 260 outputs a command to the sub power supply ECU 421 and the sub power supply relay ECU 431 and switches a connection state of the sub power supply 423 to the state illustrated in FIG. 6 in which the protection relay 422 is closed and the sub power supply relay 432 is open.

In this way, when the power supply that supplies electric power to the shift-by-wire system 300 is switched to the sub power supply 423, the shift ECU 260 causes the routine to proceed to Step S120. In Step S120, the shift ECU 260 determines whether the vehicle stops. Whether the vehicle stops is determined based on the vehicle speed SPD which is detected by the vehicle speed sensor 116. For example, when the vehicle speed SPD is "0," the shift ECU 260 determines that the vehicle stops.

When it is determined in Step S120 that the vehicle stops (Step S120: YES), the shift ECU 260 causes the routine to proceed to Step S130. In Step S130, the shift ECU 260 determines whether the current shift range is the parking range.

When it is determined in Step S130 that the current shift range is not the parking range (Step S130: NO), the shift ECU 260 causes the routine to proceed to Step S140. In Step S140, the shift ECU 260 outputs a command to the actuator ECU 270 and activates the actuator 210 to switch the shift range to the parking range. That is, in this case, even when the parking range is not selected by the selection device 250, the actuator 210 is automatically driven to switch the shift range to the parking range. By switching the shift range to the parking range in this way, the parking lock mechanism 230 is activated to perform lock and the vehicle is fixed to a stopped state. When the shift range is switched to the parking range and the vehicle is fixed to the stopped state in this way, the shift ECU 260 temporarily ends the routine.

On the other hand, when it is determined in Step S130 that the current shift range is the parking range (Step S130: YES), the vehicle is already fixed to the stopped state and thus the shift ECU 260 temporarily ends the routine without performing the process of Step S140.

When it is determined in Step S120 that the vehicle does not stop (Step S120: NO), the shift ECU 260 temporarily ends the routine without performing the processes of Steps S130 and S140. That is, when the voltage of the main power supply 410 is equal to or less than the threshold value X2, the shift ECU 260 waits until the vehicle stops and performs switching to the parking range by repeatedly performing the routine.

When the voltage of the main power supply 410 is equal to or less than the threshold value X2, switching to a shift range other than the parking range is not performed after the shift range has been switched to the parking range once. That is, switching of the shift range based on a signal from the selection device 250 is prohibited and the shift range is fixed to the parking range.

In this way, the vehicle fixing process is a fail-safe process for a power supply failure and is a process of supplying electric power to the shift-by-wire system 300 from the sub power supply 423 when a power supply failure occurs and automatically switching the shift range to the parking range to fix the vehicle to a stably stopped state when the vehicle stops. When the shift range is switched to the parking range through the vehicle fixing process in this way, the meter ECU 140 displays a warning indicating that a power supply failure occurs, an icon or text indicating that the parking lock mechanism 230 is automatically activated for safety, or the like on the display unit 141.

In order to switch the shift range to the parking range in Step S140, even when it is determined in Step S100 that the voltage of the main power supply 410 is equal to or less than the threshold value X2, electric power required for activating the actuator 210 to switch the shift range to the parking range has to be secured. Accordingly, the threshold value X2 is set to a value which is greater than the lower limit value Y1 which is a voltage required for switching the shift range to the parking range.

Figure 8:
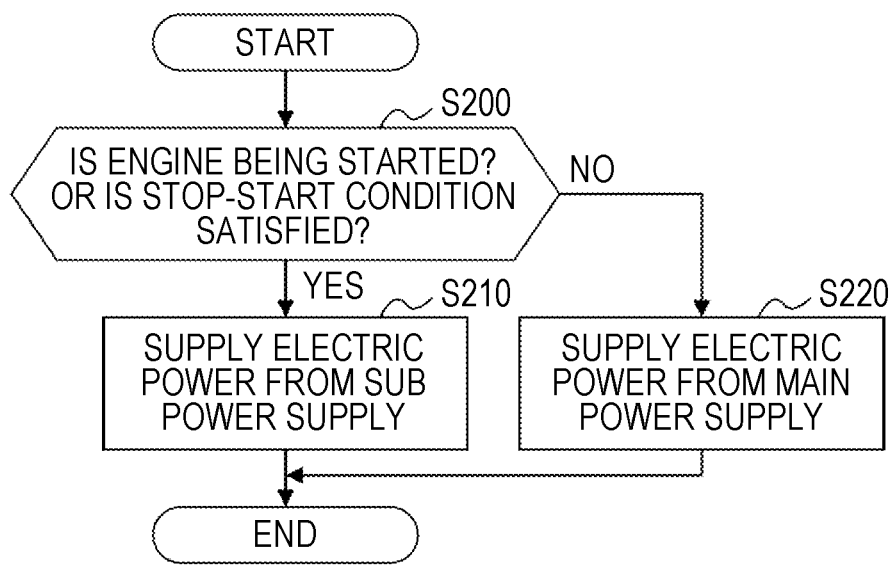
FIG. 8 is a flowchart illustrating a flow of a series of processes in a routine for a power supply switching process.

The power supply switching process will be described below with reference to FIG. 8. The routine illustrated in FIG. 8 is repeatedly performed by the shift ECU 260 when the main switch 110 is turned on and the shift ECU 260 is supplied with electric power.

When the routine is started, the shift ECU 260 first determines whether the engine 100 is being started or whether the stop-start conditions are satisfied in Step S200. The time at which the engine 100 is being started is a time at which the starter motor 101 is driven to perform cranking. The state in which the stop-start conditions are satisfied is a state in which the predetermined stop conditions which are conditions for stopping the engine through the stop-start control are satisfied.

When the determination result of Step S200 is positive (Step S200: YES), that is, when the engine 100 is being started or when the stop-start conditions are satisfied, the shift ECU 260 causes the routine to proceed to Step S210. In Step S210, the shift ECU 260 switches the power supply that supplies electric power to the shift-by-wire system 300 to the sub power supply 423 similarly to the process of Step S110.

On the other hand, when the determination result of Step S200 is negative (Step S200: NO), the shift ECU 260 causes the routine to proceed to Step S220. This state is a state in which the engine 100 is being started but the stop-start conditions are not satisfied. That is, this state is a state in which the engine 100 is operating. In Step S220, the shift ECU 260 does not switch the power supply that supplies electric power to the shift-by-wire system 300 to the sub power supply 423, but supplies electric power to the shift-by-wire system 300 from the main power supply 410.

When the process of Step S210 or S220 is performed, the shift ECU 260 temporarily ends this routine. By repeatedly performing the routine, the shift ECU 260 supplies electric power to the shift-by-wire system 300 from the main power supply 410 while the engine 100 is operating. Then, the shift ECU 260 switches the power supply that supplies electric power to the shift-by-wire system 300 to the sub power supply 423 until starting of the engine 100 is completed through the automatic start control after the engine 100 has been stopped through the automatic stop control. That is, the shift ECU 260 performs the power supply switching process by repeatedly performing the routine.

A routine of a stopped range switching process which is performed when the power supply that supplies electric power to the shift-by-wire system 300 is switched to the sub power supply 423 through the routine of the power supply switching process and electric power is being supplied to the shift-by-wire system 300 from the sub power supply 423 in the state in which the engine 100 is stopped will be described below with reference to FIG. 9.

Figure 9:
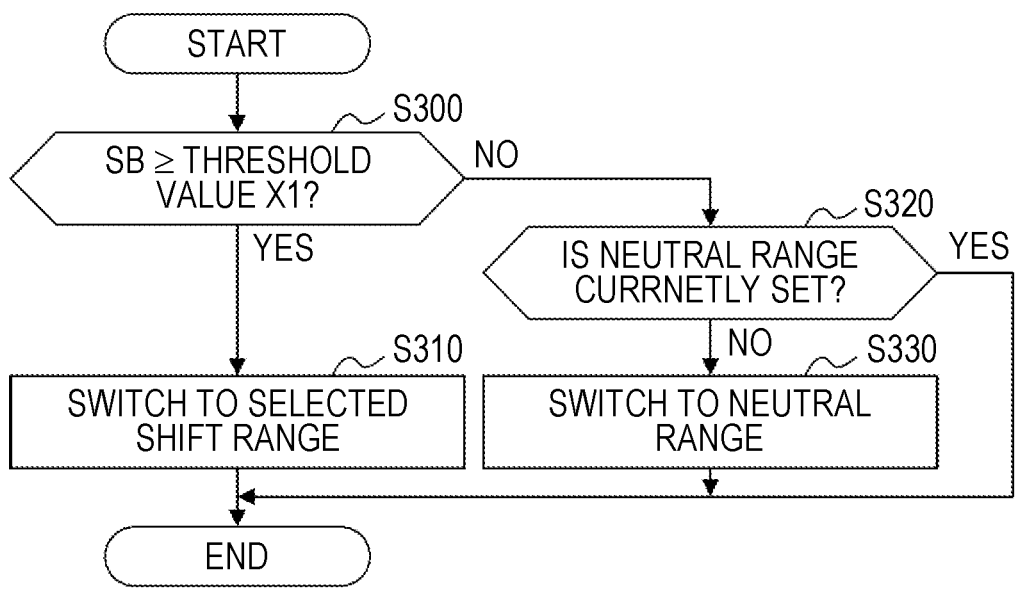
FIG. 9 is a flowchart illustrating a flow of a series of processes in a routine for a stopped range switching process.

The routine illustrated in FIG. 9 is performed by the shift ECU 260 when the shift lever 251 is operated by a driver and a shift range is selected in a state in which electric power is supplied to the shift-by-wire system 300 from the sub power supply 423.

When this routine is started, the shift ECU 260 determines whether a voltage SB which is the voltage of the sub power supply 423 is equal to or greater than a threshold value X1. The threshold value X1 is set to a value which is greater than the threshold value X2 and at which electric power required for switching the shift range to the neutral range at least once can be secured in addition to electric power required for switching the shift range to the parking range even when it is determined in Step S300 that the voltage SB is less than the threshold value X1.

When it is determined in Step S300 that the voltage SB of the sub power supply 423 is equal to or greater than the threshold value X1 (Step S300: YES), sufficient electric power for switching the shift range is secured. Accordingly, at this time, the shift ECU 260 causes the routine to proceed to Step S310, outputs a command to the actuator ECU 270, and drives the actuator 210 such that the shift range is switched to a shift range selected by the selection device 250. The shift ECU 260 performs the process of switching the shift range to the selected shift range in this way and then ends this routine.

On the other hand, when it is determined in Step S300 that the voltage SB of the sub power supply 423 is less than the threshold value X1 (Step S300: NO), the voltage SB decreases and electric power switching the shift range cannot be secured. At this time, the shift ECU 260 causes the routine to proceed to Step S320 and determines whether the current shift range is the neutral range.

When it is determined in Step S320 that the current shift range is not the neutral range (Step S320: NO), the shift ECU 260 causes the routine to proceed to Step S330. In Step S330, the shift ECU 260 outputs a command to the actuator ECU 270 such that the shift range is switched to the neutral range, and activates the actuator 210. That is, the shift ECU 260 performs the process of switching the shift range to the neutral range even when the selected shift range is not the neutral range. Then, the shift ECU 260 ends the routine. On the other hand, when it is determined in Step S320 that the current shift range is the neutral range (Step S320: YES), the shift ECU 260 ends the routine without performing any process. In this way, as the stopped range switching process, the shift ECU 260 switches the shift range to the selected shift range in response to outputting of a signal for requiring switching of the shift range from the selection device 250 on the premise that the voltage SB of the sub power supply 423 is equal to or greater than the threshold value X1 when electric power is supplied to the shift-by-wire system 300 from the sub power supply 423. In the stopped range switching process, the shift range is switched to the neutral range which is a non-driven range in which drive power is not transmitted to the driving wheels when the voltage SB of the sub power supply 423 is less than the threshold value X1 and the selected shift range is a driven range.

After the shift range has been switched to the neutral range based on the condition that the voltage SB is less than the threshold value X1 in this way, switching of the shift range in the routine illustrated in FIG. 9 is not performed even if a driver performs a shifting operation as long as the voltage SB is not recovered to a value equal to or greater than the threshold value X1.

Switching of the power supply to the sub power supply 423 or switching of the shift range to the parking range through the vehicle fixing process described above with reference to FIG. 7 is a fail-safe process, and thus is performed prior to switching of the power supply which is performed in the routine illustrated in FIG. 8 or switching of the shift range which is performed in the routine illustrated in FIG. 9. When the parking switch 254 in the selection device 250 is operated and the parking range is selected, the shift ECU 260 does not perform the routine associated with the stopped range switching process illustrated in FIG. 9. When the parking range is selected by operating the parking switch 254, the shift ECU 260 activates the actuator 210 based on selection of the parking range and switches the shift range to the parking range as selected by the driver.

That is, as described above, after the shift range has been switched to the neutral range based on the condition that the voltage SB is less than the threshold value X1 in the routine illustrated in FIG. 9, the shift ECU 260 prohibits switching of the shift range to a range other than the parking range in response to a signal from the selection device 250 as long as the voltage SB is not recovered to a value equal to or greater than the threshold value X1. On the other hand, when the voltage SB is recovered to a value equal to or greater than the threshold value X1, the determination result of Step S300 is positive and thus prohibition of switching of the shift range in response to the signal from the selection device 250 is released.

Operations in this embodiment will be specifically described below with reference to the timing diagrams illustrated in FIG. 10. In FIG. 10, a state in stop-start control is illustrated in four steps of "0," "1," "2," and "3." "0" represents a step in which the engine 100 is operating, and "1" represents a step until the engine 100 stops after the predetermined stop conditions have been satisfied. "2" represents a step in which the predetermined stop conditions has been satisfied and the engine 100 stops, and "3" represents a step in which starting of the engine 100 is being performed through automatic start control until starting of the engine 100 is completed. In FIG. 10, a shift range is illustrated in four characters of "P," "R," "N," and "D." "P" represents the parking range, "R" represents the reverse range, "N" represents the neutral range, and "D" represents the drive range.

As illustrated in FIG. 10, when the predetermined stop conditions are satisfied at time t1 and the state in stop-start control changes from "0" to "1", the shift ECU 260 switches the power supply that supplies electric power to the shift-by-wire system 300 to the sub power supply 423 through the power supply switching routine. Supply of electric power from the sub power supply 423 is continued until starting of the engine 100 is completed at time t7 and the state in stop-start control changes from "3" to "0". While supply of electric power to the shift-by-wire system 300 from the sub power supply 423 is being performed in this way, the stopped range switching process described above with reference to FIG. 9 is performed.

When the engine 100 stops at time t2, the state in stop-start control changes from "1" to "2". At time t3, a command for requiring switching to the parking range is output from the selection device 250 by a driver's shifting operation. Since the voltage SB of the sub power supply 423 at this time is greater than the threshold value X1, the shift ECU 260 switches the shift range to the parking range which is the selected shift range. Since the actuator 210 is activated with switching of the shift range, electric power of the sub power supply 423 is consumed and the voltage SB decreases.

At time t4, a command for requiring switching to the reverse range is output from the selection device 250 by a driver's shifting operation. Since the voltage SB of the sub power supply 423 at this time is also greater than the threshold value X1, the shift ECU 260 switches the shift range to the reverse range which is the selected shift range. Since the actuator 210 is activated with switching of the shift range, electric power of the sub power supply 423 is consumed and the voltage SB decreases. At this time, the voltage SB decreases to be less than the threshold value X1.

At time t5, the predetermined stop conditions are not satisfied, the state in stop-start control changes from "2" to "3", and starting of the engine 100 is performed through automatic start control such that cranking is performed.

At time t6, a command for requiring switching to the drive range is output from the selection device 250 by a driver's shifting operation. The voltage SB of the sub power supply 423 at this time is less than the threshold value X1. Accordingly, the shift ECU 260 switches the shift range to the neutral range instead of the selected drive range. At this time, the state in stop-start control is "3", the starter motor 101 is activated with electric power of the main power supply 410, and supply of electric power to the shift-by-wire system 300 is performed from the sub power supply 423. Accordingly, it is possible to switch the shift range without being affected by a decrease in voltage of the main power supply 410 due to activation of the starter motor 101.

Since the actuator 210 is activated with switching of the shift range, electric power of the sub power supply 423 is consumed and the voltage SB decreases. As described above, the threshold value X1 is set to a value which is greater than the threshold value X2 and at which electric power required for switching the shift range to the neutral range at least once can be secured in addition to electric power required for switching the shift range to the parking range. Accordingly, even after the shift range has been switched to the neutral range in this way, the voltage SB of the sub power supply 423 is greater than the lower limit value Y1. That is, in this step, electric power required for switching to the parking range in the vehicle fixing process described above with reference to FIG. 7 is secured.

At time t7, the starting of the engine 100 is completed and the state in stop-start control changes from "3" to "0." Then, the shift ECU 260 switches the power supply that supplies electric power to the shift-by-wire system 300 from the sub power supply 423 to the main power supply 410. When the starting is completed and the engine 100 is operating, electric power generated by the alternator 102 is charged in the main power supply 410 and the sub power supply 423, and thus the voltage SB increases to be greater than the threshold value X1 as indicated by an alternate long and two short dashes line in FIG. 10.

At time t10, when a command for requiring switching to the drive range is output from the selection device 250 by a driver's shifting operation, the shift ECU 260 switches the shift range to the drive range which is the selected shift range. At this time, switching of the shift range is performed using electric power of the main power supply 410. Accordingly, the shift range is switched from the neutral range to the drive range which is a shift range selected by the driver.

Advantages of this embodiment will be described below.

(1) Until starting of the engine 100 through automatic start control has been completed, switching of the shift range is performed using electric power of the sub power supply 423. That is, the actuator 210 is activated using electric power of the sub power supply 423 other than the main power supply 410 instead of the main power supply 410 of which the voltage decreases with starting of the engine 100. Accordingly, even when the start time of the engine 100 and the activation time of the actuator 210 with an operation for requiring switching of the shift range overlap each other, the activation of the actuator 210 is not affected by the decrease in voltage of the main power supply 410 due to starting of the engine 100.

(2) Since the sub power supply 423 is an auxiliary power supply which is used when the main power supply 410 cannot be used, an amount of electric power stored therein is less than an amount of electric power stored in the main power supply 410. Accordingly, when the electric power of the sub power supply 423 decreases and the voltage SB decreases due to repeated switching of the shift range, there is concern that the actuator 210 will stop partway.

For example, it is assumed that the state in which the engine 100 stops through stop-start control, that is, the state in stop-start control, is "2", the predetermined stop conditions are not satisfied in the state in which the parking ranges is selected, and the engine 100 is started. When electric power of the sub power supply 423 is already consumed at this time and the voltage SB decreases, there is concern that the manual valve 220 will stop partway, for example, when the shift range is switched from the parking range to the drive range while the engine 100 is being started. In the manual valve 220, when the shift range is switched from the parking range to the drive range, the valve member 221 moves from the position of "p" to the position of "d" through the positions "r" and "n." When the actuator 210 stops partway due to a decrease of the voltage SB and the valve member 221 stops at the position of "r," there is concern that the gear stage for reverse travel will be formed and drive power in the reverse travel direction will be transmitted to the driving wheels even if the drive range is selected.

On the other hand, when the voltage SB of the sub power supply 423 is less than the threshold value X1, the shift ECU 260 switches the shift range to the neutral range which is a non-driven range even if the driven range is selected by a shifting operation. Accordingly, when an amount of electric power stored in the sub power supply 423 decreases, the shift range is fixed to the non-driven range. As a result, it is possible to avoid driving of the vehicle in a state in which the actuator 210 stops partway and the shift range is set to a shift range other than the shift range selected by a driver.

That is, with the shift ECU 260, it is possible to realize switching of a shift range corresponding to a driver's operation using electric power of the sub power supply 423 as much as possible. When an amount of electric power in the sub power supply 423 decreases, the shift range is switched to the non-driven range and thus it is possible to prevent drive power from being transmitted to the driving wheels in a state in which the actuator 210 stops partway and the shift range is set to a driven range other than the shift range selected by a driver.

(3) The shift ECU 260 performs the vehicle fixing process described above with reference to FIG. 7. Through this vehicle fixing process, when the voltage of the power supply decreases remarkably and is equal to or less than the threshold value X2, the shift range is switched to the parking range, the parking lock mechanism 230 is activated, and movement of the vehicle is regulated. Thereafter, as long as the voltage is not recovered to be greater than the threshold value X2, switching of the shift range corresponding to a signal from the selection device 250 is prohibited. Accordingly, it is possible to regulate movement of the vehicle by activating the parking lock mechanism 230 before the voltage of the power supply decreases such that switching of the shift range cannot be appropriately performed.

(4) In the stopped range switching process described above with reference to FIG. 9, when the voltage SB of the sub power supply 423 is less than the threshold value X1 and switching of the shift range is requested, the shift range is switched to the neutral range in a state in which electric power required for switching the shift range to the parking range is left in the vehicle fixing process. Accordingly, it is possible to perform the stopped range switching process in a state in which room for performing the vehicle fixing process is left.

(5) As described above, the shift ECU 260 does not perform the routine associated with the stopped range switching process when the parking switch 254 in the selection device 250 is operated and the parking range is selected. When the parking range is selected by operating the parking switch 254, the shift ECU 260 switches the shift range to the parking range as selected by the driver even if the voltage SB of the sub power supply 423 is less than the threshold value X1. That is, switching to the parking range in the shift ECU 260 is permitted. Accordingly, when a driver selects the parking range, it is possible to regulate movement of the vehicle by activating the parking lock mechanism 230 as selected by the driver.

(6) The shift ECU 260 repeatedly performs the routine associated with the stopped range switching process illustrated in FIG. 9. Accordingly, when the voltage SB of the sub power supply 423 is recovered to a value equal to or greater than the threshold value X1, switching of the shift range corresponding to a signal from the selection device 250 becomes possible again.

(7) In the power supply switching process which is performed by the shift ECU 260, when starting of the engine 100 is completed, activation of the starter motor 101 ends, and charging of the main power supply 410 and the sub power supply 423 becomes possible, the state is rapidly returned such that supply of electric power to the shift-by-wire system 300 can be performed by the main power supply 410. When the power supply that supplies electric power to the shift-by-wire system 300 is switched to the main power supply 410, the stopped range switching process is not performed and switching of the shift range based on the value of the voltage SB of the sub power supply 423 is not limited. Accordingly, with the shift ECU 260, when starting of the engine 100 is completed, the control state can be rapidly returned to a normal state in which switching of the shift range corresponding to the signal output from the selection device 250 is performed.

This embodiment can be modified as follows. This embodiment and the following modified examples can be combined unless technical confliction arises. In the power supply switching process, the time at which the power supply that supplies electric power to the shift-by-wire system 300 is switched from the sub power supply 423 to the main power supply 410 may not be a time at which starting of the engine 100 is completed. For example, the switching may be performed when the engine 100 operates continuously and the power supply has been charged during a certain period after starting of the engine 100 has been completed.

When the shift range is set to a shift range other than the selected shift range and the shift range is a non-driven range, drive power is not transmitted to at least the driving wheels. Accordingly, in the stopped range switching process, when the voltage SB is less than the threshold value X1, the shift range may be switched to the parking range and then switching of the shift range may be prohibited. In this case, similarly to the advantage of (2), it is possible to prevent drive power from being transmitted to the driving wheels in a state in which the actuator 210 stops partway and the shift range is set to a driven range other than the selected shift range. In this case, the threshold value X1 may be less than the threshold value X1 in the above embodiment, and has only to be greater than a voltage which is required for switching to the parking range.

In the selection device 250 in the above embodiment, the parking switch 254 is provided separately from the shift lever 251 and the parking range is selected by operating the parking switch 254. In this case, when the shift range is switched to the parking range because the voltage SB at the time of operating the shift lever 251 is less than the threshold value X1, the parking range which cannot be selected using the shift lever 251 may be selected even if the parking switch 254 is not operated. In this example, there is a likelihood that a driver will feel uneasiness. On the other hand, with the stopped range switching process according to the above embodiment, since the shift range is switched to the neutral range which is a shift range which can be selected by operating the shift lever 251, it is possible to curb such uneasiness.

When the parking lock mechanism 230 is activated with switching to the parking range, vibration may be generated due to engagement between the parking gear 231 and the lock pole 232. In the stopped range switching process according to the above embodiment, since the shift range is switched to the neutral range in which such vibration is not generated out of non-driven ranges, it is also possible to curb generation of vibration.

An example in which the vehicle fixing process is performed preferentially to the stopped range switching process and the shift range is switched to the parking range when the voltage of the power supply is equal to or less than the threshold value X2 is described above, but the vehicle fixing process may not be performed preferentially. For example, a configuration in which the vehicle fixing process is omitted and the vehicle fixing process is not performed may be employed.

As long as the vehicle fixing process does not have to be essentially performed, the threshold value X1 may be set to a value which is greater than at least the lower limit value Y1 based on the lower limit value Y1 of the voltage required for switching to the neutral range and switching of the shift range may be prohibited after the shift range is switched to the neutral range when the voltage SB is less than the threshold value X1. When this configuration is employed, the stopped range switching process of switching the shift range to a non-driven range when the voltage SB is less than the threshold value X1 is achieved.

In the manual valve 220, since the position of "p" is located at an end of a movable range of the valve member 221, power consumption for moving the valve member 221 to the position of "p" is great. Accordingly, when a configuration in which the configuration for finally switching the shift range to the parking range with a decrease of the voltage of the power supply is omitted is employed as described above, switching to a requested shift range has priority and electric power of the sub power supply 423 can be used immediately before. The shift range is switched to the neutral range at a time point at which the electric power finally becomes less than the threshold value X1.

In the above embodiment, when the voltage SB of the sub power supply 423 is recovered to a value equal to or greater than the threshold value X1, prohibition of switching of the shift range is released. The conditions for releasing prohibition of switching of the shift range may be appropriately changed. For example, when the voltage SB becomes less than the threshold value X1 and switching of the shift range is prohibited once, prohibition of switching of the shift range may not be released until starting of the engine 100 is completed and activation of the starter motor 101 ends. This configuration can be realized by not performing the routine of the stopped range switching process described above with reference to FIG. 9 until starting of the engine 100 is completed after the voltage SB has become less than the threshold value X1 and switching of the shift range has been prohibited.

In the above embodiment, a vehicle including only the engine 100 as a drive power source is employed. On the other hand, the same configuration may be applied as a shift ECU of a hybrid vehicle including an engine 100 and a motor as drive power sources or a so-called series hybrid type hybrid vehicle including a motor as a drive power source and including an engine 100 as a power generator. That is, the same configuration as the shift ECU described in the above embodiment can be applied to a vehicle including a shift-by-wire system in which a manual valve is activated with an electric actuator, a main power supply, and a sub power supply. Accordingly, the configuration can also be applied to a control device for a shift-by-wire system which is mounted in a hybrid vehicle. The same configuration may be applied as a control device that controls a shift-by-wire system with a stepless transmission that continuously changes a gear ratio.

The shape of the shift gate 253 is not limited to the shape described above with reference to FIG. 2. For example, a configuration in which the shift gate 253 is formed such that the shaft 252 is guided downward from the reference position in FIG. 2 and a position of the shaft 252 when the shaft 252 is moved downward from the reference position along the shift gate 253 in FIG. 2 is set as a B position can also be considered. When the B position is selected, a brake range is selected and the gear shifting ECU 280 is controlled such that the valve member 221 is moved to the same position as the drive range and a gear stage for forward travel lower than that when the drive range is selected is selected. When this configuration is employed, an engine brake is more likely to operate by selecting the brake position than that when the drive range is selected.

In the above embodiment, the selection device 250 that selects a shift range by moving the shaft 252 of the shift lever 251 along the shift gate 253 is employed, but the same shift ECU can be applied regardless of a combination with the selection device having such a configuration as long as the vehicle includes a shift-by-wire system.

For example, the selection device may be a push button type selection device in which buttons corresponding to the shift ranges are provided and a desired shift range is selected by pressing the button corresponding to the desired shift range. The selection device may be a rotary switch type selection device in which a shift range is selected by rotating a knob to a position corresponding to each shift position disposed around the knob.

In the above embodiment, the shift ECU 260 controls the shift-by-wire system 300 in cooperation with a plurality of ECUs such as the actuator ECU 270, the gear shifting ECU 280, and the sub power supply ECU 421, but the control device for a shift-by-wire system is not limited to such a configuration. For example, the control device for a shift-by-wire system may be configured as a single control device into which the functions of the plurality of ECUs are combined. The control device for a shift-by-wire system may be configured as an ECU into which the functions of the ECUs controlling parts other than the shift-by-wire system such as the engine ECU 120 and the stop-start ECU 130 are combined.

An ECU which is an electronic control unit including a memory in which a program is stored and a processor that executes a program is exemplified as the control device for a shift-by-wire system, but the control device is not limited to the control device including a memory and a processor and performing software processes. For example, the control device may include a dedicated hardware circuit that performs at least some of the software processes in the above embodiment in hardware, for example, an ASIC. That is, the control device has only to have one of the following configurations (a) to (c). (a) This configuration includes a processor that performs all the processes in accordance with a program and a program storage device such as a storage device that stores a program. (b) This configuration includes a processor that performs some of the above processes in accordance with a program, a program storage device, and a dedicated hardware circuit that performs the other processes. (c) This configuration includes a dedicated hardware circuit that performs all the above processes. The number of software executing devices including a processor and a program storage device or the number of dedicated hardware circuits may be two or more. This is not limited to the shift ECU but the same is true of the ECUs which are described above in the above embodiment.

What is claimed is:

1. A control device for a shift-by-wire system that is applied to a vehicle including a shift-by-wire system that operates a manual valve of an automatic transmission by driving an electric actuator based on a signal which is output from a selection device that is operated by a driver, including a main power supply and a sub power supply as power supplies for supplying electric power to auxiliary machines of an engine, and performing automatic stop control for automatically stopping the engine when a predetermined stop condition is satisfied and automatic start control for automatically starting the engine when a predetermined start condition is satisfied, the control device being configured to perform:

a power supply switching process of switching the power supply for supplying electric power to the shift-by-wire system to the sub power supply until starting of the engine by the automatic start control is completed after the engine has been stopped by the automatic stop control; and a stopped range switching process of switching a shift range to a selected shift range based on the premise that a voltage of the sub power supply is equal to or greater than a threshold value in response to outputting of a signal for requiring switching of the shift range from the selection device when electric power is supplied from the sub power supply to the shift-by-wire system and switching the shift range to a non-driven range in which drive power is not transmitted to driving wheels when the voltage of the sub power supply is less than the threshold value.

2. The control device for a shift-by-wire system according to claim 1, wherein the control device is configured to further perform a vehicle fixing process of switching the shift range to a parking range in which a parking lock mechanism is activated and prohibiting switching of the shift range in response to the signal from the selection device when a voltage of the main power supply is less than the threshold value and less than a lower-limit threshold value which is greater than a lower limit value of a voltage required for switching the shift range to the parking range.

3. The control device for a shift-by-wire system according to claim 2, wherein the threshold value is a voltage at which switching of the shift range to a neutral range and switching to the parking range subsequent thereto are possible, and
   wherein the stopped range switching process includes switching the shift range to the neutral range and prohibiting switching of the shift range to a range other than the parking range in response to the signal from the selection device when the voltage of the sub power supply at the time of outputting of the signal for requiring switching of the shift range from the selection device is less than the threshold value.

4. The control device for a shift-by-wire system according to claim 3, wherein the stopped range switching process includes releasing prohibition of switching of the shift range in response to the signal from the selection device when the voltage of the sub power supply is recovered to a value equal to or greater than the threshold value.

5. The control device for a shift-by-wire system according to claim 1, wherein the power supply switching process includes switching the power supply for supplying electric power to the shift-by-wire system to the main power supply when starting of the engine has been completed.

\* \* \* \* \*